(12) United States Patent
Aoki

(10) Patent No.: US 8,462,435 B2
(45) Date of Patent: Jun. 11, 2013

(54) IMAGING APPARATUS WITH LIGHT TRANSMISSIVE FILTER

(75) Inventor: Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 408 days.

(21) Appl. No.: 12/821,328

(22) Filed: Jun. 23, 2010

(65) Prior Publication Data

US 2011/0002040 A1    Jan. 6, 2011

(30) Foreign Application Priority Data

Jul. 6, 2009   (JP) ................................ 2009-159965

(51) Int. Cl.
*G02B 27/28* (2006.01)

(52) U.S. Cl.
USPC ............. 359/486.01; 359/491.01; 250/208.1; 250/225; 250/226; 396/275; 396/276

(58) Field of Classification Search
USPC .......... 359/486.01, 489.08, 491.01; 396/241, 396/275, 276, 307; 250/208.1, 225, 226
See application file for complete search history.

(56) References Cited

U.S. PATENT DOCUMENTS

| | | | | |
|---|---|---|---|---|
| 4,041,308 A | * | 8/1977 | Fujita ............................ | 250/226 |
| 4,676,596 A | * | 6/1987 | Kato et al. ..................... | 359/619 |
| 4,737,621 A | * | 4/1988 | Gonsiorowski et al. ... | 250/201.9 |
| 4,807,981 A | * | 2/1989 | Takizawa et al. ........ | 359/489.19 |
| 6,650,474 B2 | * | 11/2003 | Osawa ...................... | 359/489.07 |
| 6,882,365 B1 | | 4/2005 | Aoki | |
| 6,940,061 B2 | * | 9/2005 | Baharav et al. ............... | 250/226 |
| 7,098,442 B2 | * | 8/2006 | Chahal et al. .................. | 250/225 |
| 7,411,733 B2 | * | 8/2008 | Toyoda et al. ................ | 359/619 |
| 7,535,640 B2 | * | 5/2009 | Totzeck et al. ........... | 359/486.01 |
| 2003/0128409 A1 | * | 7/2003 | Vook et al. ..................... | 358/513 |
| 2003/0160157 A1 | * | 8/2003 | Baharav et al. ............... | 250/226 |
| 2004/0173730 A1 | * | 9/2004 | Chahal et al. .................. | 250/225 |
| 2006/0087572 A1 | * | 4/2006 | Schroeder ..................... | 348/272 |
| 2006/0268357 A1 | * | 11/2006 | Vook et al. ..................... | 358/448 |
| 2007/0090275 A1 | * | 4/2007 | Toyoda et al. ............. | 250/208.1 |
| 2007/0216786 A1 | * | 9/2007 | Hung et al. ................... | 348/246 |
| 2008/0002255 A1 | * | 1/2008 | Tavor et al. ................... | 359/464 |
| 2008/0144177 A1 | * | 6/2008 | Miller ........................... | 359/498 |

FOREIGN PATENT DOCUMENTS

| | | |
|---|---|---|
| JP | 2007-086720 | 9/2003 |
| JP | 3771054 | 2/2006 |

* cited by examiner

*Primary Examiner* — Frank Font
(74) *Attorney, Agent, or Firm* — IPUSA, PLLC

(57) ABSTRACT

An imaging apparatus includes a light receiving device array having light receiving devices two-dimensionally arranged in both a row direction and a column direction, and a light transmissive filter disposed in front of the light receiving device array, wherein the light transmissive filter includes plural types of band-shaped light transmissive sections having respective, different light transmissive characteristics, and the plural types of band-shaped light transmissive sections are arranged in sequence in a width direction thereof.

12 Claims, 9 Drawing Sheets

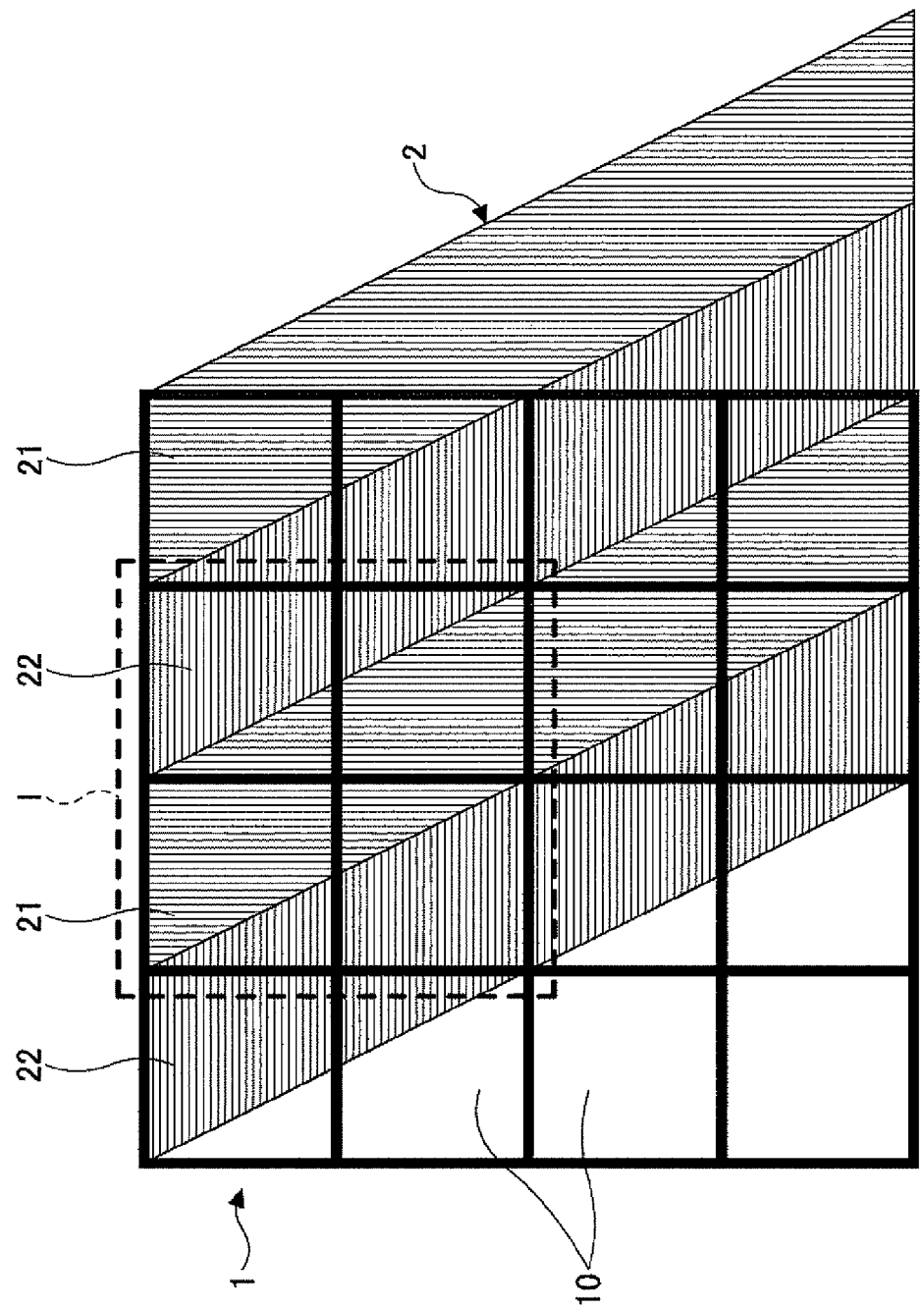

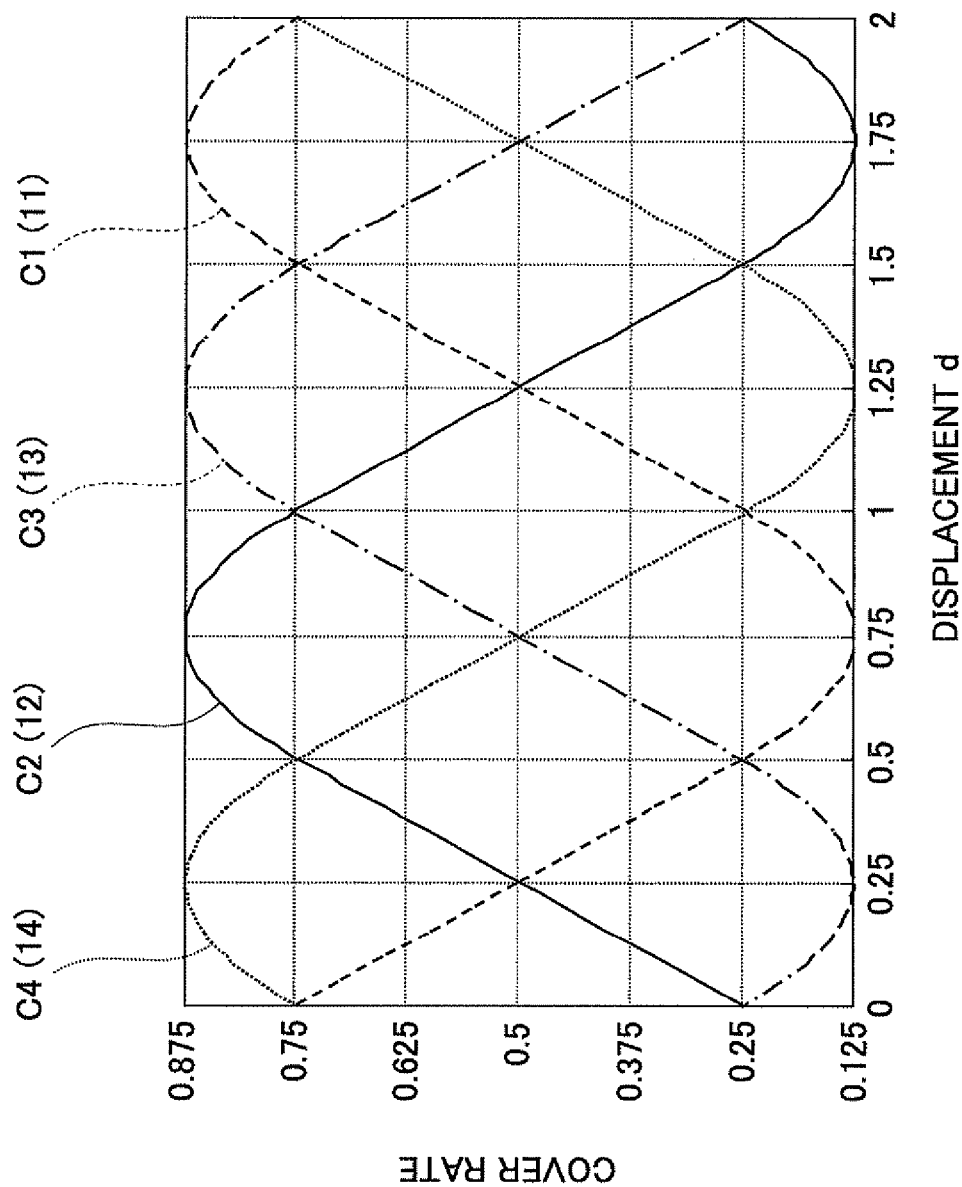

IMAGING APPARATUS WITH LIGHT TRANSMISSIVE FILTER

BACKGROUND OF THE INVENTION

1. Field of the Invention

The disclosures herein relate to an imaging apparatus that is provided with a light transmissive filter having a plurality of polarizing filters or color separation filters arranged therein, and that produces image signals by imaging an object.

2. Description of the Related Art

In digital cameras or the like, an imaging apparatus takes an image of an object to produce image signals, and may separate the image signals into image data of different wavelength bands. In other examples, an imaging apparatus takes an image of an object to produce image signals, and may separate the image signals into image data of different polarization components. This may be performed for the purpose of enhancing the contrast of the imaged object by removing unnecessary polarization components. Such imaging apparatuses may use a light receiving device array in which light receiving devices of the same type are arranged, and may separate incoming light into light components having different polarization directions or different wavelength bands.

For example, an area-divided-type filter that has its entire area divided into plural types, each allowing the passage of light having a different characteristic, may be disposed in front of a light receiving device array such as a CCD (Charge Coupled Device), a CMOS (Complementary Metal Oxide Semiconductor), or the like. Signal processing is then performed on image signal data output from the light receiving devices. With this arrangement, a plurality of image signals are obtained as if light receiving devices of different types corresponding to light transmissive filters of respective, different characteristics were provided.

In one example, a color filter may be disposed in front of a light receiving device array such as a CCD. This color filter may include spectral filters (hereinafter referred to as "spectral filter sections") having different light transmission wavelength bands disposed in a predetermined arrangement pattern as in the case of a color separation filter (i.e., area-divided spectral filter), in which areas are divided into R (red), G (green), and B (blue). The light receiving device array is used to produce image signal data of respective colors. Such a configuration is disclosed in Japanese Patent Application Publication No. 2007-086720, for example.

In another example, a polarizing filter may be disposed in front of a light receiving device array such as a CCD. This polarizing filter may be an area-divided polarizing filter that includes plural polarizing filters (hereinafter referred to as "polarizing filter sections") having different polarization directions disposed in a predetermined arrangement pattern. A single image signal obtained by imaging an object is separated according to polarization directions to produce plural image signals. Such a configuration is disclosed in Japanese Patent No. 3771054, for example.

The imaging apparatuses as described above have the following problems.

In such imaging apparatuses, light received by a single light receiving device corresponding to a single pixel of an image needs to have passed only through one of the plural light transmissive filters (hereinafter referred to as "light transmissive filter sections"). To this end, the shape and size of each light receiving device need to match the shape and size of each light transmissive filter section if the light receiving devices are provided in one-to-one correspondence to the light transmissive filter sections.

In an imaging apparatus, a light transmissive filter provided as a separate unit is attached by an adhesive agent or the like to the front face of a light receiving device array such as a COD or CMOS. Accordingly, the provision of filter sections having shapes and sizes that match those of the light receiving devices alone is not sufficient. There is an additional requirement that the light transmissive filter sections need to be accurately aligned with the light receiving array.

If the light transmissive filter sections are displaced relative to the light receiving devices, a single light receiving device may receive light through plural polarizing filter sections having different polarization characteristics. The image signal data output from this light receiving device is different from what is intended as polarized image data. Polarized image data may not be obtained at all depending on the ratio of mixing of lights.

If the light transmissive filter is displaced by rotation relative to the light receiving devices, such a displacement may be regarded as a parallel displacement in a small area of interest for a small rotation angle. In the same manner as described above, such an arrangement gives rise to a problem in that polarization information may not be properly obtained.

These problems that result from the use of a polarizing filter in which plural polarizing filter sections are arranged as an array also occur in the case of a spectral filter in which spectral filter sections are arranged as an array. If the position of a color separation filter is misaligned with the light receiving devices, image signal data produced by a light receiving device ends up being an average of image signals corresponding to lights passing through the respective RGB color separation filters. This gives rise to a problem in that color image information is not properly obtained.

Accordingly, there may be a need for an imaging apparatus that can reproduce image signal data corresponding to respective light transmissive filter sections even when the accuracy of alignment of the light transmissive filter disposed in front of light receiving devices is not sufficient.

SUMMARY OF THE INVENTION

It is a general object of at least one embodiment to provide an imaging apparatus that substantially eliminates one or more problems caused by the limitations and disadvantages of the related art.

In one embodiment, an imaging apparatus includes a light receiving device array having light receiving devices two-dimensionally arranged in both a row direction and a column direction, and a light transmissive filter disposed in front of the light receiving device array, wherein the light transmissive filter includes plural types of band-shaped light transmissive sections having respective, different light transmissive characteristics, and the plural types of band-shaped light transmissive sections are arranged in sequence in a width direction thereof.

In one embodiment, an imaging apparatus includes a light receiving device array having light receiving devices two-dimensionally arranged in both a row direction and a column direction, and a light transmissive filter disposed in front of the light receiving device array, wherein the light transmissive filter includes plural types of band-shaped light transmissive sections having respective, different light transmissive characteristics, and the plural types of band-shaped light transmissive sections are arranged in sequence in a width direction thereof, wherein a direction perpendicular to a border line between the light transmissive sections is parallel to neither the row direction nor the column direction in which the light receiving devices are arranged, and wherein a width of the light transmissive sections as measured in the row direction in which the light receiving devices are arranged is substantially equal to a width of one light receiving device as measured in the row direction.

In one embodiment, an imaging apparatus includes a light receiving device array having light receiving devices two-dimensionally arranged in both a row direction and a column direction; a light transmissive filter disposed in front of the light receiving device array, and an arithmetic processing unit configured to perform arithmetic processing on image data output from the light receiving devices, wherein the light transmissive filter includes plural types of band-shaped light transmissive sections having respective, different light transmissive characteristics, and the plural types of band-shaped light transmissive sections are arranged in sequence in a width direction thereof, and wherein the arithmetic processing is performed to obtain a weighted sum of image data output from a plurality of light receiving devices by using weight factors calculated in advance.

According to at least one embodiment, an imaging apparatus in which a light transmissive filter having different types of light transmissive sections is disposed in front of light receiving devices can reproduce image data corresponding to the respective light transmissive sections over the entire area of the image even when the accuracy of alignment of the light transmissive filter relative to the light receiving devices is not sufficient.

BRIEF DESCRIPTION OF THE DRAWINGS

Other objects and further features of embodiments will be apparent from the following detailed description when read in conjunction with the accompanying drawings, in which:

FIG. 2 is a drawing illustrating an arrangement pattern of polarizing filter sections of a area-divided polarizing filter that is provided in the imaging apparatus according to the first embodiment;

FIG. 4 is a graph chart illustrating a cover rate that indicates the size of the overlapping area between a given polarizing filter section and a given light receiving device as a proportion of the area size of the given polarizing filter section with respect to various displacements in the horizontal direction (i.e., row direction);

DESCRIPTION OF THE PREFERRED EMBODIMENTS

In the following, embodiments will be described by referring to the accompanying drawings.

[First Embodiment]
[Imaging Apparatus]

In the following, a description will be given of an imaging apparatus according to a first embodiment by referring to FIG. 1 through FIG. 6.

The imaging apparatus of the present embodiment takes an image of an object once by using a pair of a light receiving device array and an area-divided polarizing filter. The imaging device then reconstructs two image data corresponding to the vertical polarization component and the horizontal polarization component, respectively, from the obtained original image data.

Figure 1:
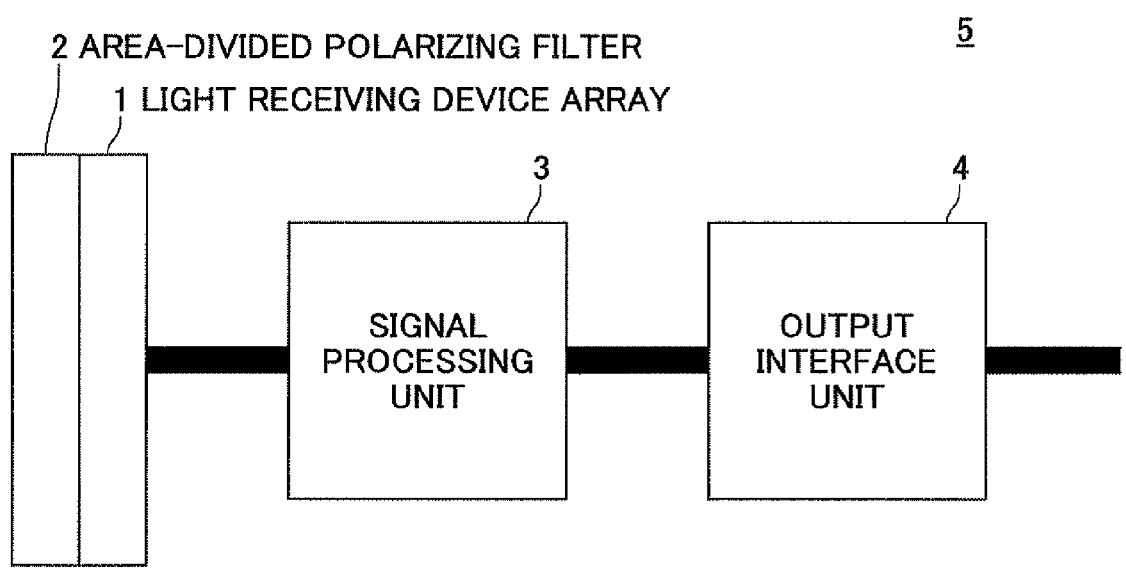
FIG. 1 is a block diagram schematically illustrating the entire configuration of an imaging apparatus according to a first embodiment.

A description will first be given of the entire configuration of the present embodiment by referring to FIG. 1. FIG. 1 is a block diagram schematically illustrating the entire configuration of the imaging apparatus according to the present embodiment.

As illustrated in FIG. 1, an imaging apparatus 5 of the present embodiment includes a light receiving device array 1, an area-divided polarizing filter 2, a signal processing unit 3, and an output interface unit 4.

The area-divided polarizing filter 2 and the signal processing unit 3 serve as a light transmissive filter and an arithmetic processing unit, respectively.

The light receiving device array 1 has light receiving devices arranged two-dimensionally in rows and columns. A CCD, MOS, CMOS, or the like may be used as the light receiving device array 1. The area-divided polarizing filter 2 is situated in front of the light receiving device array 1 on an optical path through which the light receiving device array 1 receives light. The signal processing unit 3 receives image data output from the light receiving device array 1, and produces image data that are equivalent to data obtained through respective, separate polarizing filters.

Polarizing filter sections of the present embodiment serve as light transmissive sections.

[Area-Divided Polarizing Filter]

In the following, the area-divided polarizing filter of the imaging apparatus according to the present embodiment will be described by referring to FIG. 2. FIG. 2 is a drawing illustrating an arrangement pattern of the polarizing filter sections of the area-divided polarizing filter that is provided in the imaging apparatus according to the present embodiment.

The area-divided polarizing filter 2 includes band-shaped polarizing filter sections of different types that allow the selective passage of lights having respective, different polarization directions. Specifically, as illustrated in FIG. 2, the area-divided polarizing filter 2 includes polarizing filter sections 21 and 22 of different types that allow the selective passage of lights having different polarization directions that are at 90-degree angles relative to each other. The two types of diagonal bands illustrated in FIG. 2 are the two types of polarizing filter sections 21 and 22 that correspond to the vertical direction and the horizontal direction, respectively. The two types of polarizing filter sections 21 and 22 are arranged alternately (i.e., in sequence) in a width direction. In the present embodiment, the polarizing filter section 21 may be a vertical polarization filter section for which the polarization direction is vertical. Further, the polarizing filter section 22 may be a horizontal polarization filter section for which the polarization direction is horizontal.

In the example illustrated in the present embodiment, there are two types of polarizing filter sections. In such a case, the phrase "arranged in sequence" means that the two types A and B are arranged in the order as follows: A, B, A, B, A, B, and so on.

The area-divided polarizing filter is not limited to the configuration in which two types of polarizing filter sections for transmitting vertically polarized light and horizontally polarized light are provided. The area-divided polarizing filter may have three or more types of polarizing filter sections having different polarization directions. In the case in which there are three types of polarizing filter sections provided, for example, the phrase "arranged in sequence" means that the three types A, B, and C are arranged in the order as follows: A, B, C, A, B, C, A, B, C, and so on.

The area-divided polarizing filter 2 is positioned as illustrated in FIG. 2 if the area-divided polarizing filter 2 is not misaligned with the light receiving device array 1. Namely, the area-divided polarizing filter 2 is situated to have a predetermined positional relationship as described below with light receiving devices 10 (or the light receiving sections of the light receiving devices 10), which are squares arranged in a matrix form.

Specifically, each of the vertical polarization filter section 21 and the horizontal polarization filter section 22 has a width that is equal to the width of one light receiving device (i.e., one pixel) in the horizontal direction in FIG. 2. Namely, the width of the vertical polarization filter section 21 and the width of the horizontal polarization filter section 22 as measured in the row direction in which the rows of the light receiving devices 10 extend are substantially equal to the width of one light receiving device 10 in the row direction. Further, each of the vertical polarization filter section 21 and the horizontal polarization filter section 22 has a width that is equal to the total width of two pixels in the vertical direction in FIG. 2. Namely, the width of the vertical polarization filter section 21 and the width of the horizontal polarization filter section 22 as measured in the column direction in which the columns of the light receiving devices 10 extend are substantially twice the width of one light receiving device 10 in the column direction. Accordingly, the border line between the adjacent polarizing filter sections of the area-divided polarizing filter has a slope equal to 2. In other words, the border line is diagonally positioned such that the border line crosses two light receiving devices (i.e., two pixels) in the vertical direction while it crosses one light receiving device (i.e., one pixel) in the horizontal direction.

In this manner, the arrangement pattern in which the band-shaped polarizing filter sections are arranged is a diagonal stripe pattern. The width direction in which the band-shaped polarizing filter sections are arranged is parallel to neither the horizontal direction (i.e., row direction) of the light receiving device array nor the vertical direction (i.e., column direction) of the light receiving device array. Here, the term "width direction" refers to a direction that is perpendicular to the border line.

In the present embodiment, the row direction and the column direction merely refer to the two arrangement directions of a two-dimensional array, respectively, and are interchangeable with each other. The configuration of the present embodiment thus includes an arrangement that is obtained through 90-degree rotation in which the column direction and the row direction are swapped with each other. Namely, the present embodiment includes a configuration that is obtained by replacing the horizontal direction (i.e., row direction) and the vertical direction (i.e., column direction) with the vertical direction (i.e., column direction) and the horizontal direction (i.e., row direction), respectively.

In the following, FIGS. 3A through 3D and FIG. 4 will be referred to in order to explain how the arrangement pattern of the polarizing filter sections of the area-divided polarizing filter according to the present embodiment is robust against the misalignment that occurs between the polarizing filter sections and the light receiving devices.

FIGS. 3A through 3D are drawings illustrating examples of misalignments in the horizontal direction (i.e., row direction) between the polarizing filter sections and the light receiving devices. FIG. 4 is a graph chart illustrating a cover rate that indicates the size of the overlapping area between a given polarizing filter section and a given light receiving device as a proportion of the area size of the given polarizing filter section with respect to various displacements in the horizontal direction (i.e., row direction). Specifically, FIG. 4 illustrates a cover rate between the vertical polarization filter section and a given light receiving device.

With "d" denoting a relative displacement between the polarizing filter sections and the light receiving devices, FIG. 3A, FIG. 3B, FIG. 3C, and FIG. 3D illustrate d being 0 pixel, d being ¼ pixels (0.25 pixels), d being ½ pixels (0.5 pixels), and d being ¾ pixels (0.75 pixels in the horizontal direction (i.e., row direction)), respectively. In FIG. 3A, FIG. 3B, FIG. 3C, and FIG. 3D, for the sake of simplicity of illustration, four light receiving devices 11 through 14 arranged in two rows and two columns are illustrated with the vertical polarization filter section 21 and the horizontal polarization filter section 22 overlapping these light receiving devices 11 through 14. The area enclosed by dotted lines II in FIG. 3A corresponds to the area enclosed by dotted lines I in FIG. 2. Further, for the sake of providing an easily viewable illustration, the vertical polarization filter section 21 is shown in hatching whereas the horizontal polarization filter section 22 is not shown in hatching in FIGS. 3A through 3D.

The light receiving devices 14 and 12 among the light receiving devices 11 through 14 will be described first. Specifically, a description will be given of the cover rate that indicates the size of the overlapping area between the light receiving devices 14 and 12 and the vertical polarization filter section 21 in FIGS. 3A through 3D.

Figure 3A:
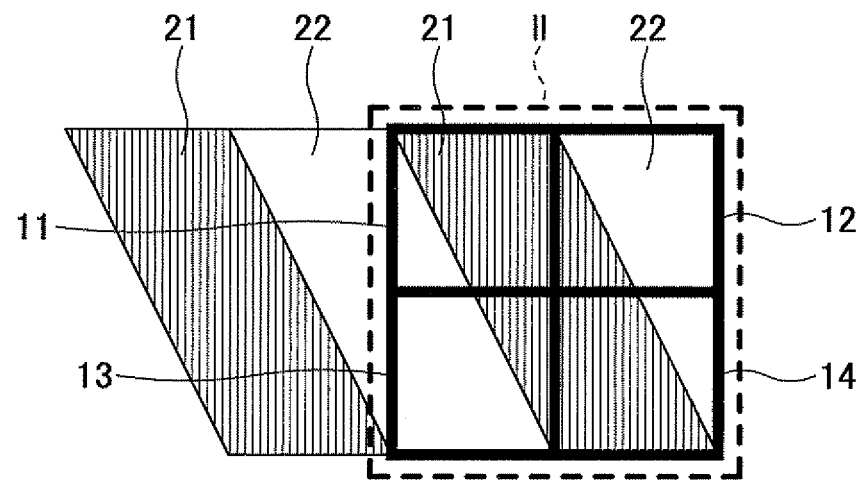
FIGS. 3A through 3D are drawings illustrating examples of misalignments in the horizontal direction (i.e., row direction) between the polarizing filter sections and the light receiving devices.
Figure 3B:
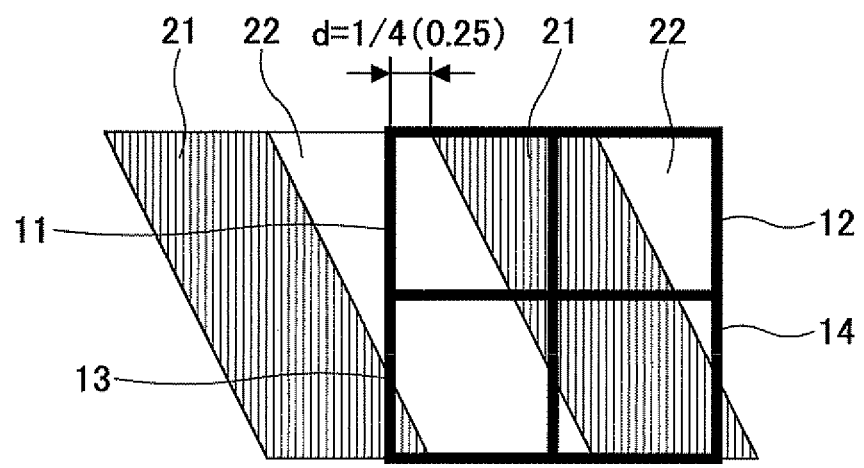
Figure 3C:
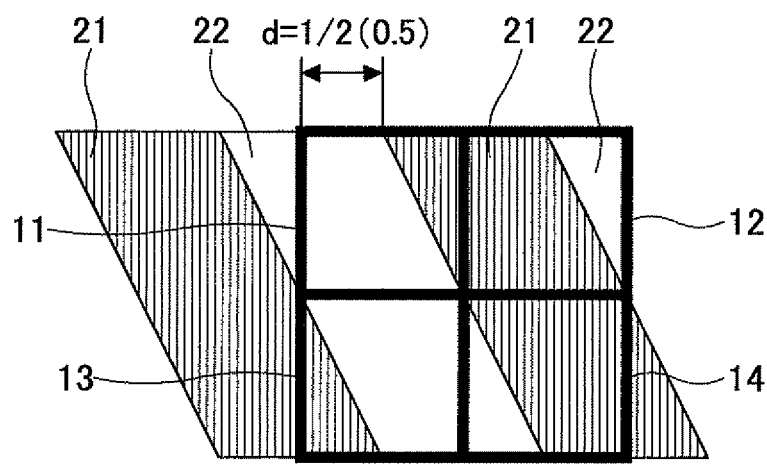
Figure 3D:
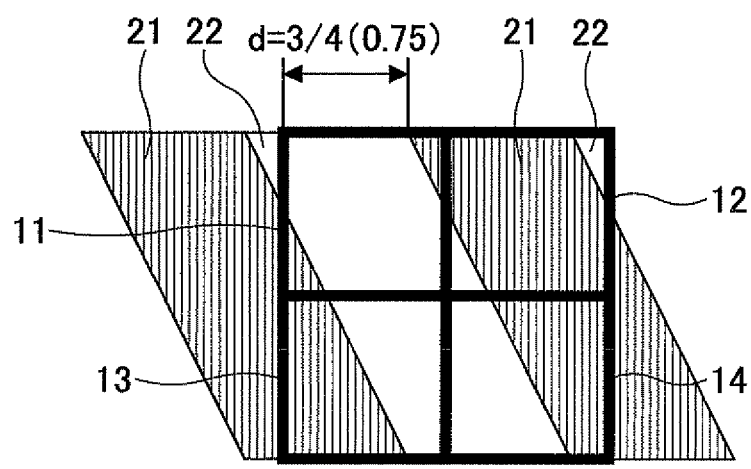

In the case of the displacement d between the polarizing filter sections and the light receiving devices being 0 as illustrated in FIG. 3A, the cover rates of the light receiving devices 14 and 12 with respect to the vertical polarization filter section 21 are 0.75 and 0.25, respectively. In the case of the displacement d between the polarizing filter sections and the light receiving devices being ¼ (0.25) as illustrated in FIG. 3B, the cover rates of the light receiving devices 14 and 12 with respect to the vertical polarization filter section 21 are 0.875 and 0.5, respectively. In the case of the displacement d between the polarizing filter sections and the light receiving devices being ½ (0.5) as illustrated in FIG. 3C, the cover rates of the light receiving devices 14 and 12 with respect to the vertical polarization filter section 21 are 0.75 and 0.75, respectively. In the case of the displacement d between the polarizing filter sections and the light receiving devices being ¾ (0.75) as illustrated in FIG. 3D, the cover rates of the light receiving devices 14 and 12 with respect to the vertical polarization filter section 21 are 0.5 and 0.875, respectively.

FIG. 4 illustrates changes in the cover rate with respect to continuous changes in the displacement d. In FIG. 4, the horizontal axis represents the displacement d in the horizontal direction (i.e., row direction) between the polarizing filter sections and the light receiving devices. One unit of the horizontal axis is equal to the width of one light receiving device in the horizontal direction (i.e., row direction). The vertical axis represents the cover rate of one light receiving device with respect to the vertical polarization filter section 21. In FIG. 4, a dashed-line curve C1, a solid-line curve C2, a chain-line curve C3, and a dotted-line curve C4 correspond to the light receiving devices 11, 12, 13, and 14 illustrated in FIG. 3A, respectively.

By referring to FIG. 4, a description will be given of the relationship between displacements and the cover rates of the vertical polarization filter section with respect to the light receiving devices 14 and 12 among the light receiving devices 11 through 14.

As illustrated in FIG. 4, the cover rate of the vertical polarization filter section 21 indicated by the curve C4 is in the range exceeding 0.75 with respect to the range of the displacement d being 0 to 0.5. Namely, 75% or more of the area of the light receiving device 14 is covered by the vertical polarization filter section 21. The curve C4 is downward sloping from left to right in the range of the displacement d being 0.5 to 1.0. Namely, the cover rate of the vertical polarization filter section 21 with respect to the light receiving device 14 decreases with an increase in the displacement d. The cover rate of the vertical polarization filter section 21 indicated by the curve C2 is in the range exceeding 0.75 with respect to the range of the displacement d being 0.5 to 1.0. Namely, 75% or more of the area of the light receiving device 12 is covered by the vertical polarization filter section 21. The curves C4 and C2 in the range of the displacement d being 1.0 to 2.0 have the shape that are obtained by flipping the curves C4 and C2 in the range of the displacement d being 0 to 1.0 upside down with respect to a line of symmetry that is the horizontal line situated at a cover rate of 0.5. The areas of the light receiving devices 14 and 12 that are not covered by the vertical polarization filter section 21 are covered by the horizontal polarization filter section 22. In the range of the displacement d being 1.0 to 2.0, thus, the cover rate of the horizontal polarization filter section 22 is 75% or more.

The light receiving devices 14 and 12 are vertically adjacent to each other. When the light receiving device 12 on the upper side is covered half by the vertical polarization filter section 21 and half by the horizontal polarization filter section 22 (i.e., when the displacement d is 0.25), the light receiving device 14 on the lower side is mainly covered by the vertical polarization filter section 21. When the light receiving device 14 on the lower side is covered half by the vertical polarization filter section 21 and half by the horizontal polarization filter section 22 (i.e., when the displacement d is 0.75), the light receiving device on the upper side is mainly covered by the vertical polarization filter section 21. With respect to two light receiving devices that are horizontally adjacent to each other, the cover rate of the light receiving device on the right-hand side with respect to coverage by one polarizing filter section is the same as the cover rate of the light receiving device on the left-hand side with respect to coverage by the other polarizing filter section. In respect of a vicinity area comprised of the four pixels arranged in a 2-pixel-by-2-pixel matrix (i.e., in two rows and two columns), therefore, one of these four pixels is mainly covered (i.e., with a cover rate of 0.75 or more) by the vertical polarization filter section 21, and another pixel is mainly covered (i.e., with a cover rate of 0.75 or more) by the horizontal polarization filter section 22. This is true for any displacement d.

Such an advantage described above is not obtained if the area-divided polarizing filter has other arrangement patterns.

Figure 5:
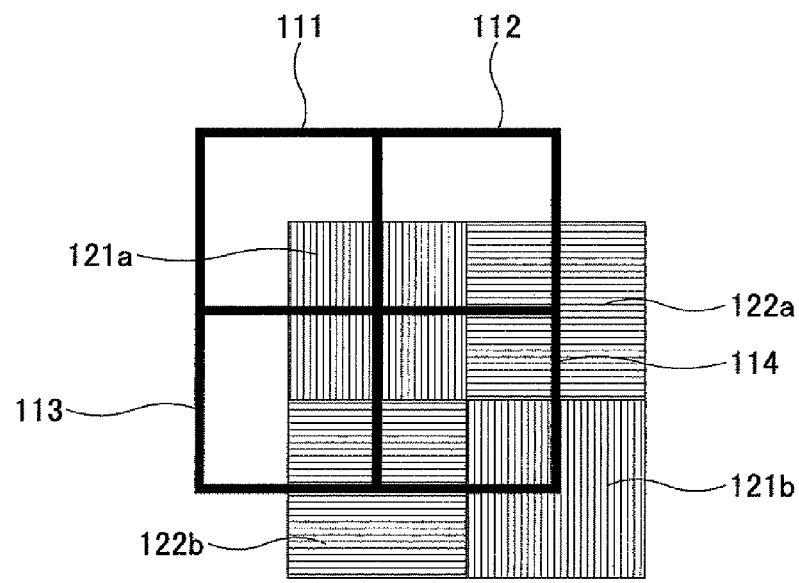
FIG. 5 is a drawing illustrating an example in which the arrangement pattern of an area-divided polarizing filter is a checker board pattern, and is displaced by ½ (0.5) in the horizontal direction (i.e., row direction) and in the vertical direction (i.e., column direction), respectively, relative to the light receiving devices.

A checker board pattern will be compared with the present embodiment by referring to FIG. 5. FIG. 5 is a drawing illustrating an example in which the arrangement pattern of an area-divided polarizing filter is a checker board pattern, and is displaced by ½ (0.5) in the horizontal direction (i.e., row direction) and in the vertical direction (i.e., column direction), respectively, relative to the light receiving devices.

Each light receiving device may have a width of 6 micrometers in both the horizontal direction (i.e. row direction) and the vertical direction (i.e., column direction). The polarizing filter sections are then displaced relative to the light receiving devices by 3 micrometers (i.e., ½ pixels) in the horizontal direction and the vertical direction. In FIG. 5, four light receiving devices 111, 112, 113, and 114 and four polarizing filter sections are illustrated. The four polarizing filter sections include vertical polarization filter sections 121a and 121b and horizontal polarization filter sections 122a and 122b. In the state illustrated in FIG. 5, the light received by the light receiving device 114 is an average of lights passing through the four polarizing filter sections 121a, 121b, 122a, and 122b. The output of the light receiving device 114 becomes substantially constant regardless of what polarization direction the incoming light has. No information about polarization can thus be obtained. The same positional relationships between the light receiving devices and the polarizing filter sections continue in the horizontal direction (i.e., row direction) and in the vertical direction (i.e., column direction). Accordingly, in all the light receiving devices, in addition to the light receiving device 114, the received light becomes an average of the lights passing through the four polarizing filter sections. No information about polarization can thus be obtained.

In contrast to what is described above, neither the cover rate by the vertical polarization filter section nor the cover rate by the horizontal polarization filter section becomes the same in all the four light receiving devices corresponding to the vicinity area comprised of a 2-pixel-by-2-pixel matrix according to the present embodiment. This is true regardless of the displacement d between the light receiving devices and the polarizing filter sections. When the polarization direction of incoming light changes, thus, the combination of four pixel outputs is bound to change. Information about polarization can thus be obtained.

The slope of a border line between adjacent polarizing filter sections relative to a border line between adjacent light receiving devices may be set to a value that is different from 2. When the slope is 2 and the width of the filter section in the horizontal direction is one pixel, however, the width of the filter section in the vertical direction becomes 2 pixels. This arrangement provides a repetition of the same arrangement in every two pixels in the vertical direction. Such an arrangement can thus help to use a narrow vicinity area, thereby preventing effective resolution from being reduced. Also, such an arrangement can reduce the amount of computation performed by an arithmetic processing unit, which will be described later.

The above description has been provided with respect to a case in which the area-divided polarizing filter is displaced relative to the light receiving device array in the horizontal direction (i.e., row direction). The same arguments also apply in the case of the area-divided polarizing filter being displaced relative to the light receiving device array in the vertical direction (i.e., column direction).

Further, rotational displacement by a small angle can be approximated by parallel displacement in the vicinity area. The same arguments as those described above can thus apply.

[Signal Processing]

Figure 6:
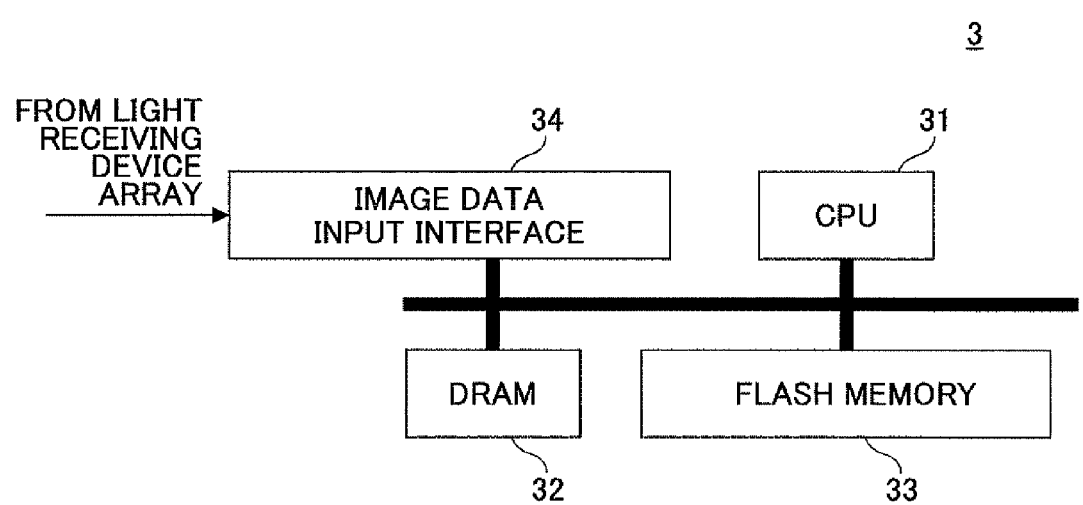
FIG. 6 is a block diagram illustrating the configuration of a signal processing unit of the imaging apparatus according to the first embodiment.

In the following, a description will be given of a signal processing method that reconstructs image data of each filter component from image data obtained by use of the above-described arrangement pattern by referring to FIG. 6. FIG. 6 is a block diagram illustrating the configuration of the signal processing unit of the imaging apparatus according to the present embodiment.

As previously described, the arrangement pattern in which the band-shaped polarizing filter sections are arranged is a diagonal stripe pattern. Namely, the arrangement pattern in which the band-shaped polarizing filter sections are arranged is the diagonal stripe pattern previously described. The width direction in which the band-shaped polarizing filter sections are arranged is parallel to neither the horizontal direction (i.e., row direction) of the light receiving device array nor the vertical direction (i.e., column direction) of the light receiving device array.

The diagonal stripe pattern is employed as the arrangement pattern of the area-divided polarizing filter. This prevents polarization information from being unobtainable when the polarizing filter is misaligned with the light receiving device array.

In the arrangement pattern of the polarizing filter sections having the diagonal stripe pattern, however, one polarizing filter section does not coincide with one light receiving device. Rather, a plurality of polarizing filter sections coincides with one light receiving device. Because of this, image data including only the light component passing through only one polarizing filter section cannot be obtained in a straightforward manner.

In consideration of this, a signal processing method as will be described below is performed. This signal processing method reconstructs plural types of image data corresponding to respective types of polarizing filter sections from image data obtained by taking an image of an object by use of the diagonal stripe arrangement pattern in the area-divided polarizing filter.

As illustrated in FIG. 6, the signal processing unit 3 includes a CPU 31, a DRAM 32, a nonvolatile memory such as a flash memory 33, and an image data input interface 34. The signal processing unit 3 executes programs stored in the nonvolatile memory by use of the CPU 31 and the DRAM 32. With this provision, the signal processing unit 3 performs signal processing on the image data received from a light receiving device array through the image data input interface. Data obtained by the signal processing is sent to an output interface unit.

In this example, signal processing is performed by use of software running on the CPU 31. Such signal processing may alternatively be performed by a hardware-implemented arithmetic processing circuit.

Figure 7:
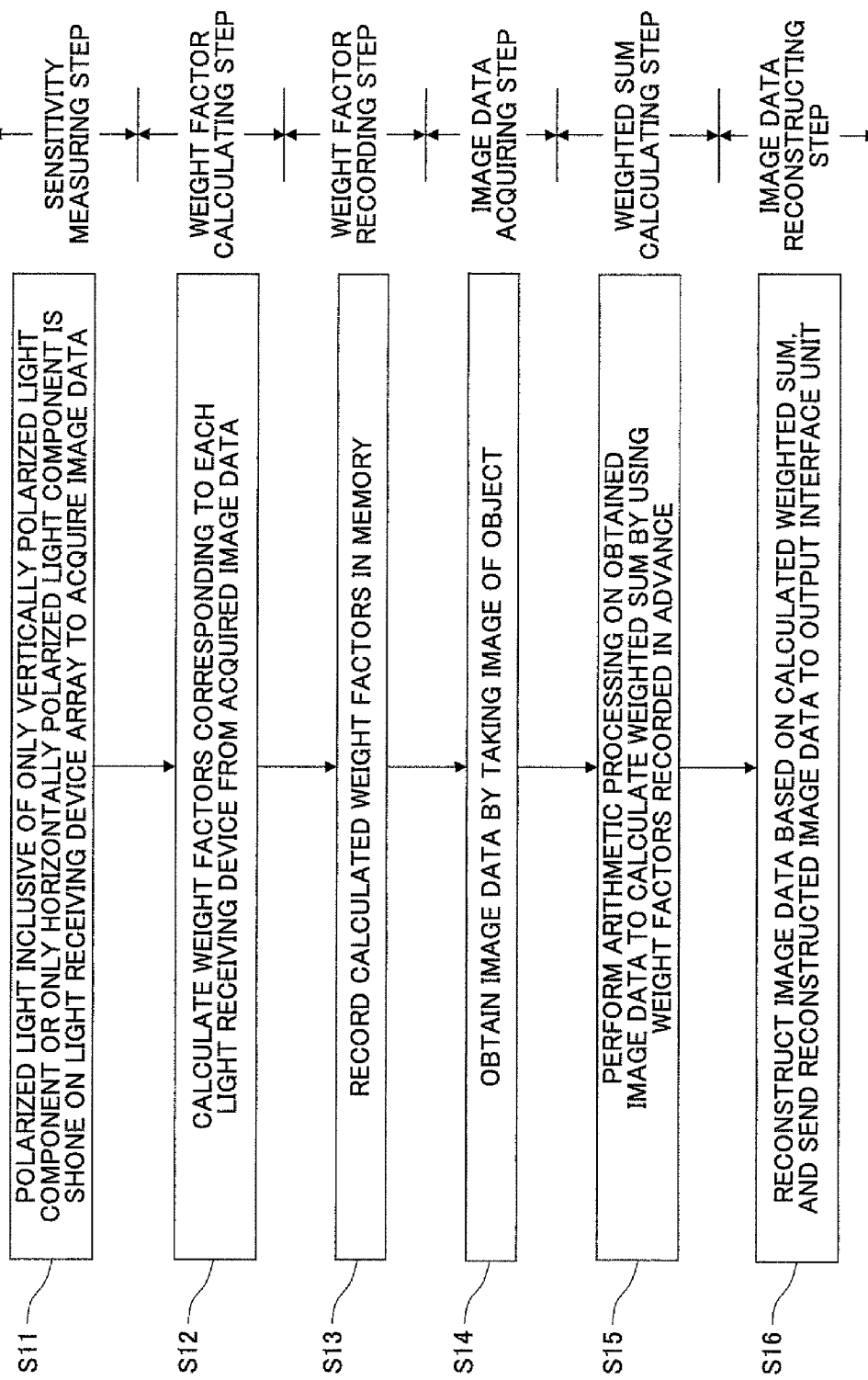
FIG. 7 is a flowchart illustrating a signal processing method performed by the imaging apparatus according to the first embodiment.

In the following, a description will be given of the signal processing method performed by the imaging apparatus according to the present embodiment by referring to FIG. 7. FIG. 7 is a flowchart illustrating the signal processing method performed by the imaging apparatus according to the present embodiment.

As illustrated in FIG. 7, the signal processing method of the present embodiment includes a sensitivity measuring step (step S11), a weight factor calculating step (step S12), a weight factor recording step (step S13), an image data acquiring step (step S14), a weighted sum calculating step (step S15), and an image data reconstructing step (step S16).

In the signal processing method of the present embodiment, step S11 through step S13 are performed in advance. Then, step S14 through step S16 are performed at the time of taking an image of an object.

As described above, the sensitivity measuring step (step S11) is performed in advance. In this step S11, polarized light (100% polarization) inclusive of only the vertically polarized light component or only the horizontally polarized light component is shone on the light receiving device array, and image data output from the light receiving device array is input into the signal processing unit.

The light receiving device array with the area-divided polarizing filter attached thereto is prepared in advance. Specifically, the area-divided polarizing filter may be attached to a face of the light receiving device array by an adhesive agent. The positioning, including angular alignment, of the polarizing filter sections of the area-divided polarizing filter relative to the light receiving devices of the light receiving device array does not have to be precise, and may suffice if approximate matching is achieved. The light receiving device array with the area-divided polarizing filter attached thereto is combined with the signal processing unit and the output interface unit to prepare the imaging apparatus of the present embodiment.

Light with the 100% vertically polarized light component having uniform intensity is then shone on the entire face of the light receiving device array. Output values of the light receiving devices of the light receiving device array are then recorded as reference image data RI1. Subsequently, light with the 100% horizontally polarized light component having uniform intensity is shone on the entire face of the light receiving device array. Output values are then recorded as reference image data RI2.

The values of the reference image data RI1 and RI2 with respect to a given light receiving device (i.e., pixel) are proportional to the sensitivities of this light receiving device (i.e., pixel) with respect to vertically polarized light and horizontally polarized light, respectively. The sensitivities for vertically polarized light and horizontally polarized light are mainly determined by the cover rates of this light receiving device (i.e., pixel) with respect to the vertical polarization filter section and the horizontal polarization filter section, respectively. These sensitivities do not vary after the area-divided polarizing filter is fixedly mounted to the light receiving device array.

The weight factor calculating step (step S12) is then performed. In this step S12, the signal processing unit calculates weight factors corresponding to respective light receiving devices based on the acquired image data. The calculation of the weight factors is performed by using formula (5), which will be described later.

Next, the weight factor recording step (step S13) is performed. In this step S13, the calculated weight factors are stored in memory. The memory for storing the weight factors may be the nonvolatile memory such as the flash memory 33.

After step S11 through step S13 are performed in advance as described above, step S14 through step S16 are performed at the time of taking an image of an object.

First, the image data acquiring step (step S14) is performed. In this step S14, an image of an object is taken to produce image data.

Next, the weighted sum calculating step (step S15) is performed. In this step S15, arithmetic processing is performed to obtain a weighted sum from the acquired image data by using the stored weight factors.

The vertically polarized light component of incident light is denoted as $L_v$, the horizontally polarized light component denoted as $L_h$, the sensitivity of the vertically polarized light component of a light receiving device i denoted $a_{vi}$, and the sensitivity of the horizontally polarized light component denoted as Intensity $I_i$ of incident light entering the light receiving device i through the area-divided polarizing filter is represented as follows.

$$I_i = a_{vi} L_v + a_{hi} L_h \quad (1)$$

Assuming that the same light enters the adjacent light receiving devices arranged in two rows and two columns, the above equation (1) is satisfied with respect to all of these four light receiving devices I1 through I4. The following equation is thus obtained.

$$\begin{bmatrix} I_{11} \\ I_{12} \\ I_{13} \\ I_{14} \end{bmatrix} = \begin{bmatrix} a_{v11} & a_{h11} \\ a_{v12} & a_{h12} \\ a_{v13} & a_{h13} \\ a_{v14} & a_{h14} \end{bmatrix} \begin{bmatrix} L_v \\ L_h \end{bmatrix} \quad (2)$$

The left-hand side of the equation (2) is denoted as I, and the two matrices on the right-hand side of the equation (2) are denoted as M and L, respectively, in the order in which they appear. Then, the equation (2) is represented as equation (3) as shown below.

$$I = ML \quad (3)$$

The intensity $I_i$ of incident light is determined from the image data output from the light receiving device array. The sensitivities $a_{vi}$ and $a_{hi}$ of vertically and horizontally polarized light components of the light receiving device i are known from the data measured in step S11. Only the polarized light components $L_v$ and $L_h$ of the incident light are unknown.

The equation (3) represents simultaneous linear equations in which the number of constraint conditions is larger than the number of unknown values $L_v$ and $L_h$. Such a problem is solved by applying a pseudo inverse matrix M of the matrix M to the equation (3) as follows:

$$L = M^+ I \quad (4)$$

where $$M^+ = (M^T M)^{-1} M^T \quad (5).$$

Depending on the displacement between the polarizing filter sections and the light receiving devices, there are cases in which information about polarization is rather difficult to obtain. Such cases occur when the cover rates of adjacent pixels by a filter section are close to 50% in the pixel area comprised of pixels arranged in two rows and two columns. The use of the arithmetic processing method of the present embodiment, however, allows the solutions for $L_v$ and $L_h$ to be obtained in such a manner as to minimize errors through the use of a pseudo inverse matrix.

As previously described, the matrix $M^+$ is calculated for all the light receiving devices by using the equation (5) in step S12, and the calculated matrix $M^+$ is then stored in memory in step S13. After this preparation, in step S15, a weighted sum of the image data $I = (I_{11}, I_{12}, I_{13}, I_{14})$ is calculated with respect to the light receiving devices arranged in two rows and two columns, thereby obtaining the vertically and horizontally polarized light components $L = (L_v, L_h)$ of each light receiving device.

The calculation of the equation (5) is rather complicated. However, it suffices to perform the calculation of the equation (5) only once prior to an actual imaging operation. Namely, it suffices to perform the calculation only once at the time of manufacturing the camera by using a computer separate from the camera to store the results of calculation in memory. The complexity of the calculation thus does not affect the processing speed at the time of taking an image.

Lastly, the image data reconstructing step (step S16) is performed. In this step S16, image data is reconstructed from the obtained weighted sum, followed by sending the reconstructed image data to the output interface unit.

According to the imaging apparatus of the present embodiment, the polarizing filter sections having a special arrangement pattern is combined with the signal processing to reconstruct plural image data corresponding to the respective polarizing filter sections over the entire area of the image. Such reconstruction is achieved even when the accuracy of alignment is not sufficient upon attaching the area-divided polarizing filter to the light receiving device array. Since there is no need to ensure high precision for positional alignment, the manufacturing cost of the imaging apparatus can be reduced.

Furthermore, the imaging apparatus of the present embodiment can minimize an area of reference used for performing the arithmetic processing to reconstruct image data. This can prevent effective resolution from being reduced, and can also reduce the amount of computation. Since image data is reconstructed by performing simple arithmetic processing, sufficient processing speed at the time of taking an image is achieved. Moreover, the cost of hardware can be reduced. With the use of a proper polarizing filter, plural polarized light images can be taken at once.

In the arithmetic processing method described above, weight factors for the intensities of incident light are obtained from the sensitivities of each light receiving device for vertically and horizontally polarized light components, and such sensitivities are determined based on image data obtained by actually taking an image of a polarized light source or the like. With this arrangement, the obtained weight factors reflect variations in various characteristics such as the polarization extinction ratio of each polarizing filter sections, light leakage at borders between the polarizing filter sections, and the like, in addition to variation in the cover rate. The signal processing method of the present embodiment can thus correct variations in various characteristics in addition to variations in the cover rate.

Furthermore, the present embodiment employs an area-divided polarizing filter that has two types of polarizing filter sections, i.e., the vertical polarization filter section and the horizontal polarization filter section, which are arranged alternately. Notwithstanding this example, the polarizing filter sections are not limited to these two types corresponding to the vertical and horizontal polarizations, but may have a configuration in which three or more polarizing filter sections having three or more different polarization directions are arranged in sequence in a repeated manner.

[Second Embodiment]

In the following, a description will be given of an imaging apparatus according to a second embodiment by referring to FIG. 8 and FIG. 9.

Figure 8:
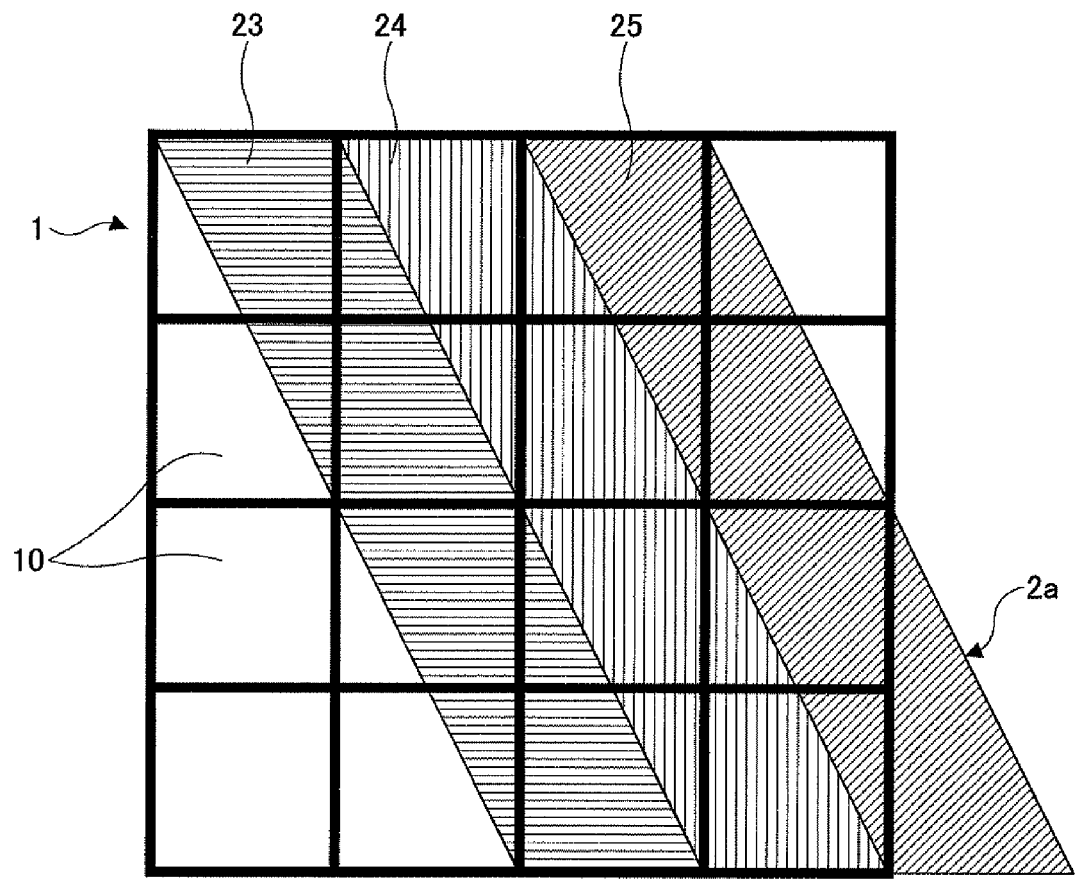
FIG. 8 is a drawing illustrating an arrangement pattern of spectral filter sections of a area-divided spectral filter that is provided in the imaging apparatus according to a second embodiment.
Figure 9:
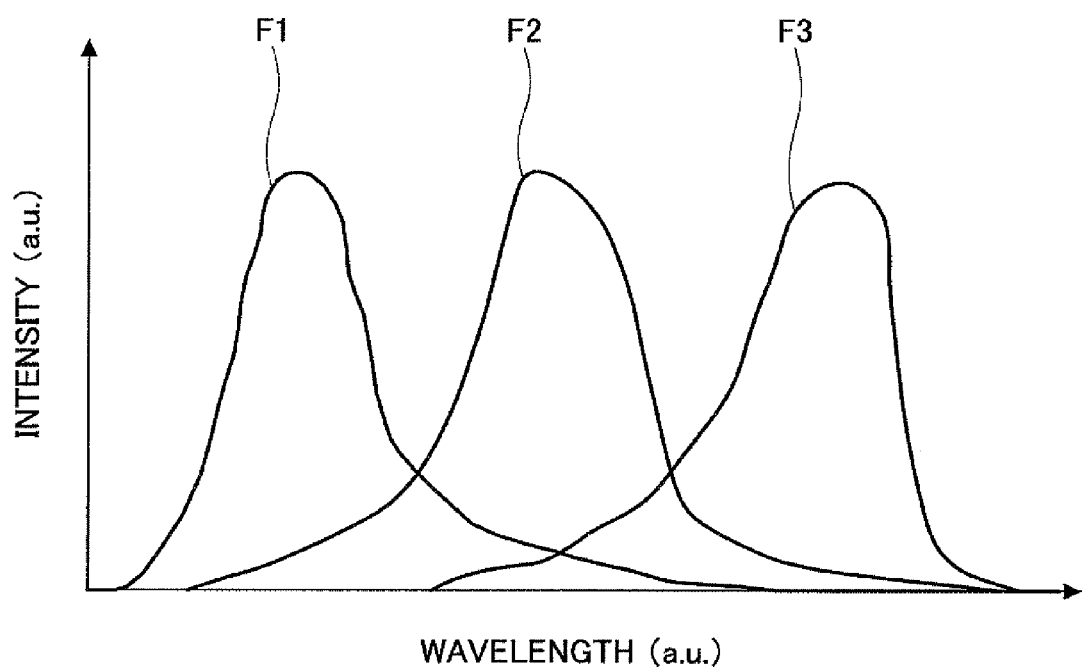
FIG. 9 is a drawing illustrating the wavelength bands of lights that pass through respective color separation filters constituting the spectral filter sections.

FIG. 8 is a drawing illustrating an arrangement pattern of the spectral filter sections of the area-divided spectral filter that is provided in the imaging apparatus according to the present embodiment. In FIG. 8, three types of spectral filter sections are illustrated. One spectral filter section is illustrated for each type. FIG. 9 is a drawing illustrating the wavelength bands of lights that pass through respective color separation filters constituting the spectral filter sections.

The imaging apparatus according to the present embodiment differs from the imaging apparatus of the first embodiment in that a spectral filter is used in place of a polarizing filter.

In the imaging apparatus of the first embodiment, the vertical polarization filter section and the horizontal polarization filter section are arranged alternately in the width direction. In the imaging apparatus of the present embodiment, on the other hand, spectral filter sections 23, 24, and 25 comprised of three types of spectral filters having respective spectral transmission characteristics are arranged in sequence in the width direction as illustrated in FIG. 8. The three types of spectral filters may include a first filter F1, a second filter F2, and a third filter F3 having three types of respective transmission wavelength bands as illustrated in FIG. 9. These spectral filters may constitute a color separation filter that allows the passage of RGB colors separately from each other. In the following, a color separation filter is regarded as a spectral filter in a broader sense, and a description will be given of a spectral filter.

In the imaging apparatus according to the present embodiment, a spectral filter is used in place of the polarizing filter that is used in the imaging apparatus of the first embodiment. The configurations of the light receiving device array, the signal processing unit, and the output interface unit are the same as those described in connection with the block diagram illustrated in FIG. 1 in reference to the first embodiment.

As in the first embodiment, the signal processing unit of the present embodiment serves as the arithmetic processing unit. The area-divided spectral filter and the spectral filter sections of the present embodiment serve as a light transmissive filter and light transmissive sections, respectively.

As illustrated in FIG. 8, each filter section of an area-divided spectral filter 2a of the imaging apparatus according to the present embodiment has a width equal to the width of one pixel in the horizontal direction (i.e., row direction) as in the first embodiment. The border lines between the spectral filter sections 23, 24, and 25 of the area-divided spectral filter 2a have a slope equal to 2. The three types of spectral filter sections 23, 24, and 25 are the first filter F1, the second filter F2, and the third filter F3, respectively, which are arranged in sequence in a repeated manner in the width direction. As illustrated in FIG. 8, the shape of the spectral filter sections 23, 24, and 25 is substantially the same as the shape of the polarizing filter sections 21 and 22 used in the first embodiment. Changes in the cover rate with respect to changes in the displacement are substantially the same as those of the polarizing filter sections of the first embodiment described in connection with FIG. 4. In the filter arrangement pattern of the present embodiment, for each spectral filter, there is at least one light receiving device that has a cover rate of at least 75% in the area comprised of 6 pixels having three pixels in the horizontal direction (i.e., row direction) and two pixels in the vertical direction (i.e., column direction). This is true for any displacement.

The signal processing method of the imaging apparatus according to the present embodiment is also substantially the same as the signal processing method used in the first embodiment. Namely, a reference image may be produced by taking an image of an object having uniform luminance with respect to each of the three types of spectral distribution. In the first embodiment, an area of reference is comprised of four light receiving devices (i.e., pixels) having two rows and two columns inclusive of a light receiving device of interest. In the present embodiment, an area of reference is comprised of 6 light receiving devices (i.e., pixels) having two rows and three columns. In the present embodiment, further, the matrix M appearing in the equation (3) described in the first embodiment is replaced with a matrix M having 6 rows and 2 columns. The pseudo inverse matrix is obtained by use of the equation (5) described in the first embodiment.

In the present embodiment, further, the transmission spectrum of each spectral filter section may properly be selected, so that a camera for producing spectral images having special spectral characteristics, such as images in the infrared region, may be provided. With the use of a proper spectral filter, plural spectral images can be taken at once.

Further, the present invention is not limited to these embodiments, but various variations and modifications may be made without departing from the scope of the present invention.

The light transmissive filter may include light transmissive sections for transmitting lights that differ from each other in at least one of the three characteristics of light, i.e., wavelength, amplitude (i.e., intensity), and wave vibration direction (i.e., polarization direction). The light transmissive filter of the first embodiment provides different light transmissive characteristics that allow the selective passage of lights different from each other in the vibration direction (i.e., polarization direction). The light transmissive filter of the second embodiment provides different light transmissive characteristics that allow the selective passage of lights different from each other in the wavelength. The light transmissive filter may provide different light transmissive characteristics that allow the selective passage of lights different from each other in the intensity (i.e., amplitude).

The present application is based on Japanese priority application No. 2009-159965 filed on Jul. 6, 2009, with the Japanese Patent Office, the entire contents of which are hereby incorporated by reference.

What is claimed is:

1. An imaging apparatus, comprising:
   a light receiving device array having light receiving devices two-dimensionally arranged in both a row direction and a column direction; and
   a light transmissive filter attached to the light receiving device array,
   wherein the light transmissive filter is formed of plural types of band-shaped light transmissive sections arranged in sequence, and
   wherein a direction perpendicular to a border line between the light transmissive sections is parallel to neither the row direction nor the column direction in which the light receiving devices are arranged.

2. The imaging apparatus as claimed in claim 1, wherein each type of the band-shaped light transmissive sections has a different light transmissive characteristic allowing selective passage of light having a different polarization direction.

3. The imaging apparatus as claimed in claim 1, wherein each type of the band-shaped light transmissive sections has a different light transmissive characteristic allowing selective passage of light having a different wavelength band.

4. An imaging apparatus, comprising:
   a light receiving device array having light receiving devices two-dimensionally arranged in both a row direction and a column direction; and
   a light transmissive filter attached to the light receiving device array,
   wherein the light transmissive filter is formed of plural types of band-shaped light transmissive sections, and the plural types of band-shaped light transmissive sections are arranged in sequence,
   wherein a direction in which the each of the plural types of the band-shaped light transmissive sections extends is parallel to neither the row direction nor the column direction in which the light receiving devices are arranged, and wherein a width of the light transmissive sections as measured in the row direction in which the light receiving devices are arranged is substantially equal to a width of one light receiving device as measured in the row direction.

5. The imaging apparatus as claimed in claim 4, wherein a width of the light transmissive sections as measured in the column direction in which the light receiving devices are arranged is substantially equal to twice a width of one light receiving device as measured in the column direction.

6. An imaging apparatus, comprising:
- a light receiving device array having light receiving devices two-dimensionally arranged in both a row direction and a column direction;
- a light transmissive filter attached to the light receiving device array; and
- an arithmetic processing unit configured to perform arithmetic processing on image data output from the light receiving devices,
- wherein the light transmissive filter is formed of plural types of band-shaped light transmissive sections, and the plural types of band-shaped light transmissive sections are arranged in sequence,
- and wherein the arithmetic processing is performed to obtain a weighted sum of image data output from a plurality of light receiving devices by using weight factors calculated in advance.

7. The imaging apparatus as claimed in claim 6, wherein the plurality of light receiving devices are four light receiving devices arranged in two rows and two columns.

8. The imaging apparatus as claimed in claim 6, wherein the arithmetic processing unit is configured to calculate the weight factors based on image data obtained by taking images of a plurality of different objects.

9. The imaging apparatus as claimed in claim 7, further comprising a memory unit configured to store the weight factors.

10. The imaging apparatus as claimed in claim 1, wherein the plural types of band-shaped light transmissive sections are arranged in sequence in a width direction thereof.

11. The imaging apparatus as claimed in claim 4, wherein the plural types of band-shaped light transmissive sections are arranged in sequence in a width direction thereof.

12. The imaging apparatus as claimed in claim 6, wherein the plural types of band-shaped light transmissive sections are arranged in sequence in a width direction thereof.

* * * * *